United States Patent
Yoo et al.

(10) Patent No.: US 6,973,258 B1
(45) Date of Patent: Dec. 6, 2005

(54) METHOD AND APPARATUS FOR RECORDING DIGITAL DATA STREAMS

(75) Inventors: Jea-Yong Yoo, Seoul (KR); Byung-Jin Kim, Kyunggi-do (KR); Kang-Soo Seo, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/410,751

(22) Filed: Oct. 1, 1999

(30) Foreign Application Priority Data

Oct. 2, 1998 (KR) .................................. 98-41937

(51) Int. Cl.[7] ............................................. H04N 5/76
(52) U.S. Cl. .................... 386/111; 386/112; 348/423.1; 370/474; 370/395.62; 370/506; 370/516; 370/519; 375/371
(58) Field of Search ................................ 386/1, 33, 13, 386/20, 98, 85, 89, 90, 91, 111, 112; 348/423.1, 348/474, 500, 497; 370/474, 476, 395.1, 370/397, 395.62, 503, 506, 508, 516, 517, 370/519; 375/371, 372; H04N 5/76, 9/79

(56) References Cited

U.S. PATENT DOCUMENTS

| | | | | |
|---|---|---|---|---|
| 5,566,174 A | * | 10/1996 | Sato et al. | .................. 370/468 |
| 5,883,924 A | * | 3/1999 | Siu et al. | ..................... 375/226 |
| 5,966,387 A | * | 10/1999 | Cloutier | ...................... 370/516 |
| 6,208,643 B1 | * | 3/2001 | Dieterich et al. | ........... 370/389 |
| 6,480,467 B1 | * | 11/2002 | Hernandez-Valencia | .... 370/230 |
| 6,493,832 B1 | * | 12/2002 | Itakura et al. | ............. 713/600 |
| 6,525,775 B1 | * | 2/2003 | Kahn et al. | ................. 348/460 |
| 6,697,432 B2 | * | 2/2004 | Yanagihara et al. | ... 375/240.26 |
| 2001/0036201 A1 | * | 11/2001 | Dieterich et al. | ............. 370/506 |
| 2002/0067744 A1 | * | 6/2002 | Fujii et al. | ................... 370/535 |
| 2002/0101989 A1 | * | 8/2002 | Markandey et al. | ........ 380/210 |

* cited by examiner

*Primary Examiner*—Thai Tran
(74) *Attorney, Agent, or Firm*—Birch, Stewart, Kolasch & Birch, LLP

(57) ABSTRACT

A method and apparatus for recording digital data streams. When a digital broadcast data stream received by a set top box is transmitted through a communication interface such as an IEEE-1394 bus to a streamer, program clock references contained in the data stream become different from the actual arrival time of the digital data stream because of different clock frequencies of the digital data stream and communication interface. The difference is compensated before the digital data stream is recorded on the streamer. The method in accordance with the present invention comprises detecting program clock references contained in received digital transport stream packets, creating the transport time reference of each transport stream packet based upon the detected program clock references and arrival times of the transport stream packets, and creating transport stream units by adding each of the created transport time reference to the associated transport stream packet.

20 Claims, 9 Drawing Sheets

FIG. 1

*Conventional Art*

FIG. 2

*Conventional Art*

| 31 30 29 28 27 26 25 | 24 23 22 21 20 19 18 17 16 15 14 13 12 | 11 10 9 8 7 6 5 4 3 2 1 0 |
|---|---|---|
| Reserved | Cycle Count | Cycle Offset |

FIG. 9

| 31 30 29 28 27 26 25 24 23 22 21 20 19 18 17 16 15 14 13 12 | 11 10 9 8 7 6 5 4 3 2 1 0 |
|---|---|
| Time Count | Time Offset |
| 0 | |

METHOD AND APPARATUS FOR RECORDING DIGITAL DATA STREAMS

MAJOR ELEMENTS IN DRAWINGS

| | | | |
|---|---|---|---|
| 50: | PCR detector | 51: | subtractor |
| 53, 79: | low-pass filter | | |
| 55, 81: | voltage-controlled oscillator | | |
| 57: | counter | 59, 63: | buffer |
| 61: | compensation unit | 65: | time stamper |
| 71: | time stamp detector | 73: | trigger |
| 75: | flip-flop | 83: | counter |
| 100: | set-top-box | 110: | system decoder |
| 120, 270: | digital transport processing unit | | |
| 130, 220: | clock controller | | |
| 140, 210: | digital receiving processing unit | | |
| 200: | streamer | 230: | stream recording unit |
| 240: | clock controller | 250: | recording medium |
| 260: | stream reproducing unit | | |

BACKGROUND OF THE INVENTION

The present invention relates to method and apparatus for compensating PCR of digital data streams. When a digital broadcast data stream received by a set top box is transmitted to a streamer and then reproduced from the streamer through a communication interface such as an IEEE-1394 bus, program clock references contained in the data stream become different from the actual arrival time of the digital data stream because of different clock frequencies of the digital data stream and communication interface. The difference is compensated by the present invention.

In conventional analog television broadcast, video signals are transmitted over the air or through cables after being AM or FM modulated. With the recent rapid advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

Figure 1:
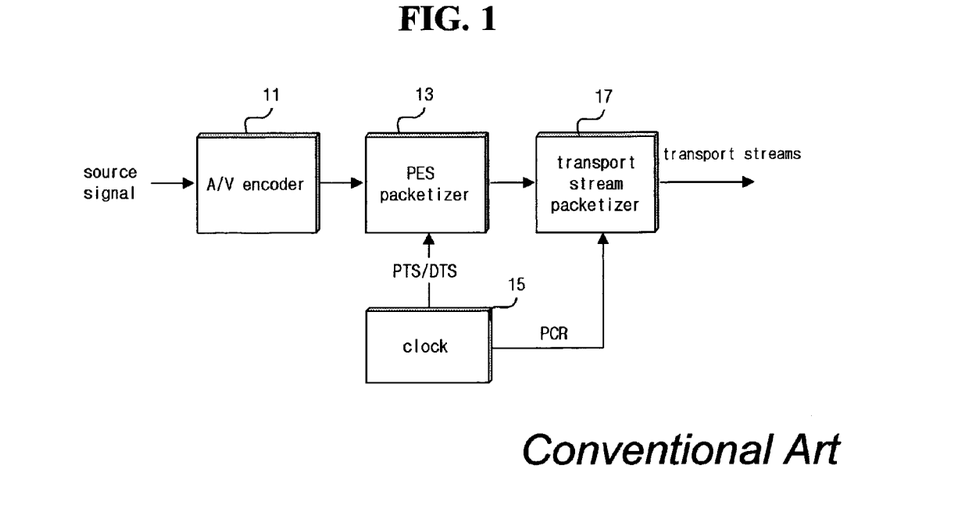
FIG. 1 is a block diagram of an MPEG encoder depicted for explaining the procedure by which time stamps are recorded in a transport stream.

FIG. 1 depicts a simplified block diagram of an MPEG encoder. An audio/video encoder 11 converts source audio and video signals into a video elementary stream and one or more audio elementary streams. The compressed audio and video elementary streams are converted into packets by a packetized elementary stream (PES) packetizer 13, wherein a presentation time stamp (PTS) and decoding time stamp (DTS) are inserted into each PES packet header. Both PTS and DTS are expressed in terms of an encoder system clock 15 and used by a decoder to synchronize the decoder time clock with the encoder system clock. The audio and video PES packets generated from a number of different programs are multiplexed into a transport stream (TS), wherein program clock references (PCRs) are inserted in the transport stream packet headers.

Figure 3:
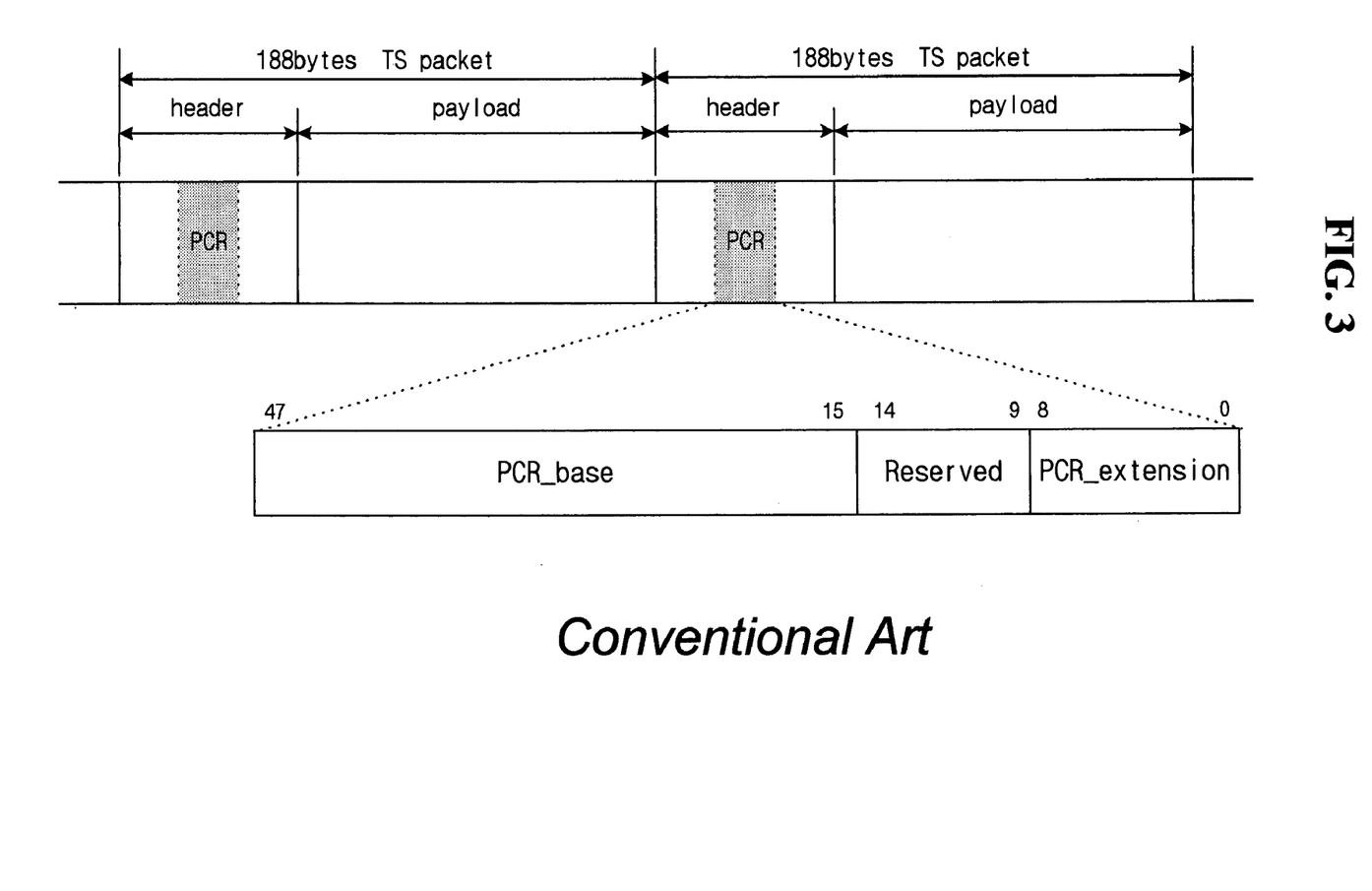
FIG. 3 is a pictorial representation of the syntax of a transport stream.

The transport stream, as shown in FIG. 3, comprises a series of transport stream packets, each transport stream packet having a fixed length of 188 bytes. The transport stream is to be transported through channels subject to transmission errors. Each transport stream packet further comprises a packet header and payload. The packet header includes a synchronization value, for use in identifying the boundaries of each transport stream packet, followed by a packet identifier or PID. The purpose of the PID is to label the transport stream packet. All packets with a particular PID have related contents, e.g., all have PES packet data for a particular elementary stream, etc. In digital broadcast systems, a plurality of programs can be multiplexed into a single transport stream.

Each program has a single time base established by a system time clock at the encoder in relation to which all elementary streams of the particular program are encoded. The system time clock typically has a frequency of 27 MHz. The PCR is simply a snapshot of this encoder system time clock for a particular program. As depicted in FIG. 3, the PCR comprises a 33-bit PCR base field of a 90 KHz, a 9-bit PCR extension of a 27 MHz, and a 6-bit reserved field for byte alignment. The 9-bit PCR extension provides a modulo-300 counter that is incremented at 37 ns intervals, whereas the 33-bit PCR base is incremented at 0.11 µs intervals. The PCR, therefore, can represent from 0 s up to 95443.7 s.

The transmitted transport stream is received by a set top box at the receiver and demultiplexed into transport streams of a plurality of programs. If a desired program is selected from among the demultiplexed programs, a transport stream depacketizer 21 of the system decoder as shown FIG. 2 contained in the set top box extracts the PCR values from the transport stream of the selected program, thereby enabling to synchronize the decoder system clock with the encoder system clock.

The value of PCR(i) is a count which reflects the value of the encoder system clock for the associated program at the time the i-th PCR bytes were inserted into the transport stream. Since the decoder does not know the value of PCR(i) until it receives PCR(i), there is a time difference between the encoder and decoder due to transmission a time delay. The time delay, however, is negligible because the decoder clock is synchronized with the encoder clock using the detected PCR values.

Figure 2:
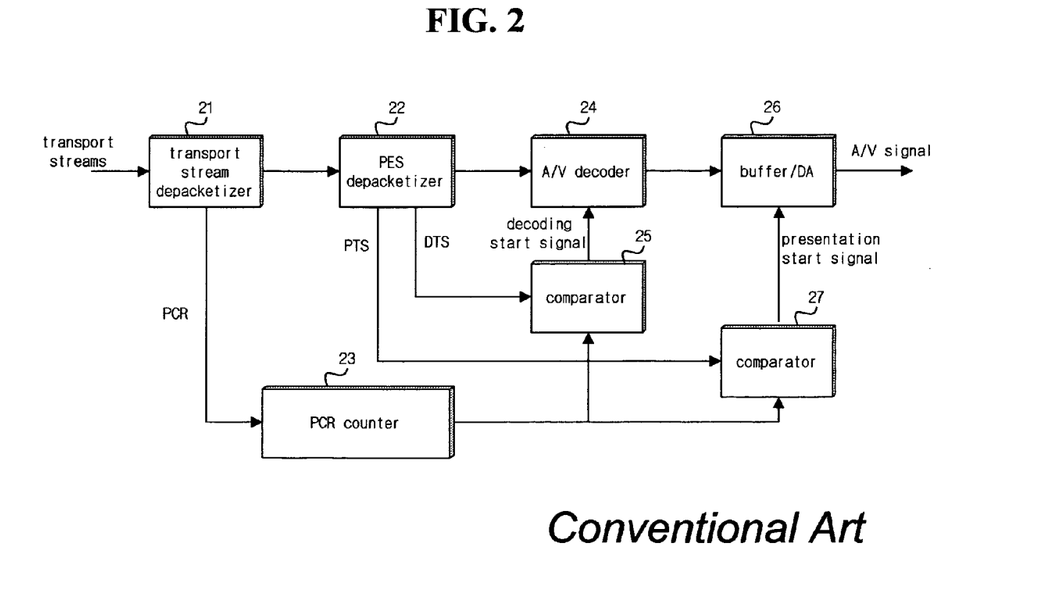
FIG. 2 is a block diagram of an MPEG decoder depicted for explaining the procedure by which a transport stream is decoded using the time stamps contained in a transport stream.

A PES depacketizer 22 in the decoder of FIG. 2 depacketizes the PES packets yielded by transport stream depacketizer 21 into elementary streams and extracts the DTSs and PTSs. An audio/video decoder 24 adjusts the decoding clock of the elementary streams using the PCRs and DTSs. The presentation time of the decoded audio and video signals are adjusted using the PCRs and PTSs and finally the decoded audio and video signals are outputted to A/V output devices such as television sets.

It is also possible to store the received digital broadcast signals on a storage medium instead of directly outputting the received broadcast signals to A/V output devices. The stored digital broadcast signals can be edited and presented afterwards. For example, the digital data stream received by a set top box can be stored in a streamer such as a digital video disk (DVD) through communication interfaces like an IEEE-1394 isochronous bus. Later, the stored digital data stream can be edited and transmitted back to the set top box so that the original digital audio and video data can be presented.

The system clock frequency of digital broadcast transport streams based upon the MPEG format is 27 MHz, whereas that of the IEEE-1394 isochronous bus is 24.576 MHz. A DVD recording/reproducing apparatus as a streamer uses the system clock of 27 MHz. Hence, if transport streams using the system clock of 27 MHz are transmitted through the IEEE-1394 isochronous bus using the system clock of 24.576 MHz, the time interval between two successive transport stream packets can change because of the different system clock frequencies.

For each program carried in a given transport stream, PCRs must be generated at least once every 100 ms and inserted into the transport stream packets carrying one of the elementary streams that make up that program. Not every transport stream packet, therefore, contains the PCR. Suppose that the time interval between a transport stream packet without a PCR and its preceding packet has changed while transmitted through the IEEE-1394 isochronous bus. If the transport stream packets are recorded by a DVD recording/reproducing apparatus, it may cause a serious problem when reproducing the transport stream because the time interval remains wrong at the time the transport stream is transmitted through the IEEE-1394 isochronous bus back to the set top box.

Currently, the transport stream is required to contain a PCR that has a frequency tolerance of 30 ppm (parts per million). If the time intervals between transport stream packets may be distorted beyond allowable range of +30 ppm at the IEEE-1394 isochronous bus, causing severe problems.

EXPLANATION OF THE INVENTION

It is an object of the present invention to provide a method and apparatus for compensating time differences in PCRs of a digital data stream accurately, the time differences being caused from different frequencies of system clocks between a digital data stream and a communication interface when a recorded digital data stream is carried through the communication interface after being recorded to a streamer through the communication interface.

It is another object of the present invention to provide a method and apparatus for synchronizing clocks between a stream processing apparatus and a communication interface that have different system clock frequencies when transmitting a digital data stream therebetween, thereby preventing time distortion between adjacent transport packets included in a digital data stream that is caused from frequency difference of system clocks.

In order that the invention may be fully understood, preferred embodiments thereof will now be described with reference to the accompanying drawings.

Figure 4:
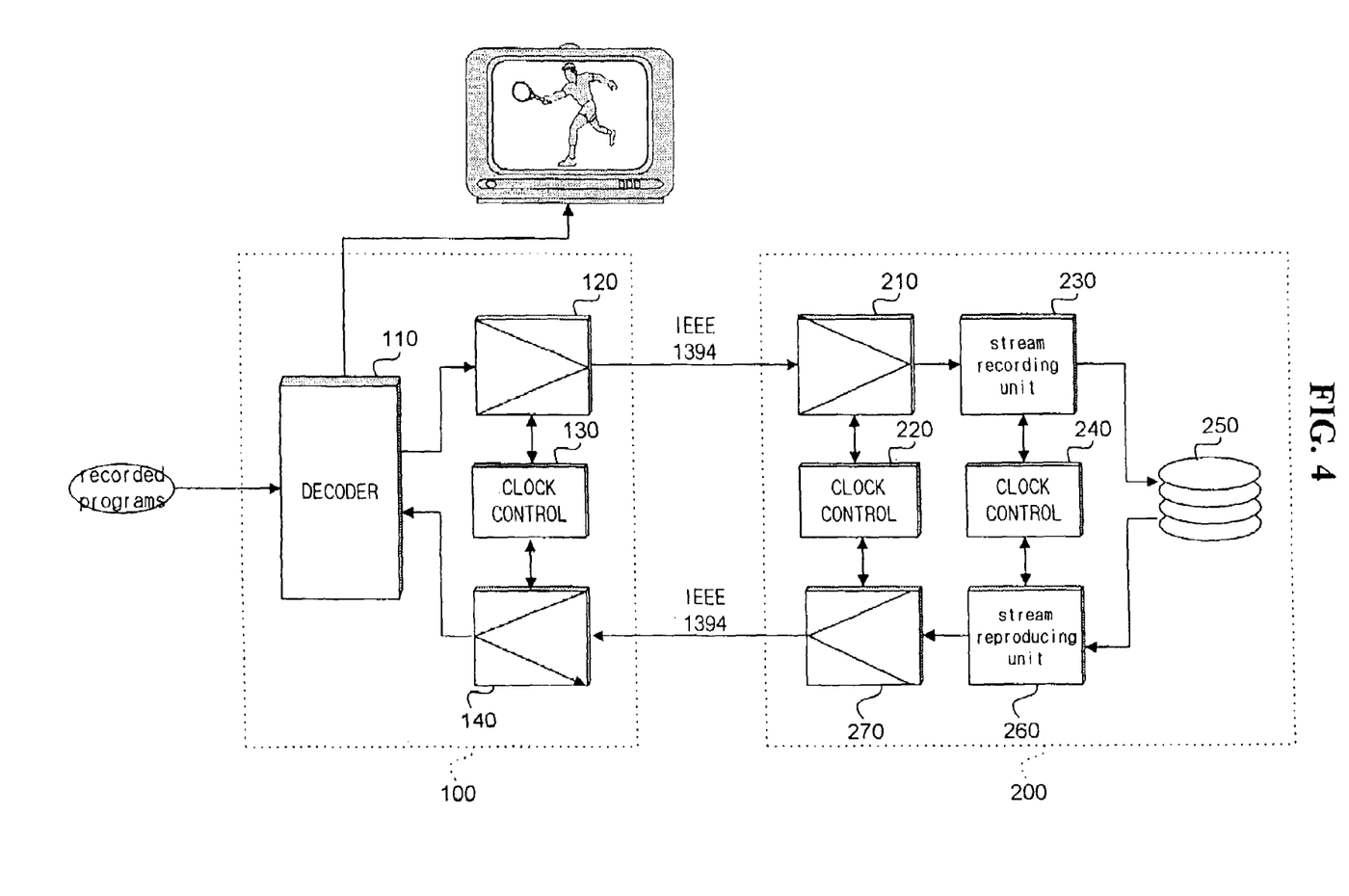
FIG. 4 is an apparatus in which a preferred embodiment of the invention may be practiced.

FIG. 4 depicts a system in which the present invention may be advantageously employed, comprising a set top box 100, a communication interface (IEEE-1394), and a streamer 200.

Receiving a transport stream into which a plurality of programs are multiplexed, set top box 100 demultiplexes the transport stream into different types of transport stream packets, decodes the transport stream of a user-chosen program by a system decoder 110, and presents the decoded transport stream through a television set or transmits the chosen transport stream through an IEEE-1394 isochronous bus to streamer 200 for storing the program.

Figure 5A:
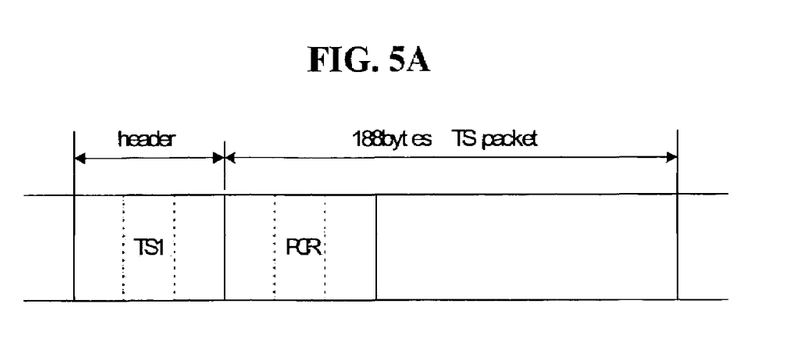
FIG. 5a is a pictorial representation of the syntax of a data stream transmitted through the communication interface shown in FIG. 4.

A digital transport processing unit 120 interfacing in the IEEE-1394 bus divides the transport stream of the chosen program into 188-byte transport stream packets using a system clock of 24.576 MHz generated by a clock controller 130 and adds a 4-byte transport header to each transport stream packet as shown in FIG. 5a before transmitting the transport stream through a IEEE-1394 isochronous bus. The transport header includes a time stamp (TS1) expressed in terms of the system clock of 24.576 MHz.

Figure 5B:
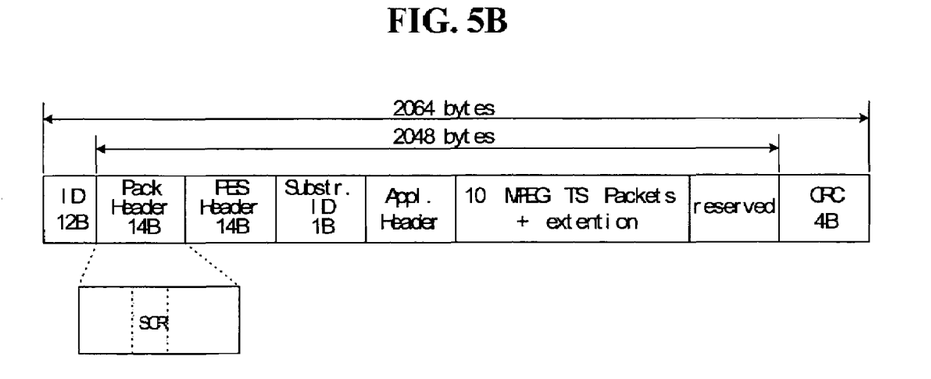
FIG. 5b is a pictorial representation of the syntax of a data stream stored in the streamer shown in FIG. 4.

Receiving the transport stream transmitted through the IEEE-1394 isochronous bus from set top box 100, a digital receiving processing unit 210 included in streamer 200 outputs transport stream packets after removing the time stamps (TS1s) from the transport headers. A stream recording unit 230 receives the transport stream from digital receiving processing unit 210, converts the transport stream into a program stream the syntax of which is shown in FIG. 5b, and records the program stream on a recording medium 250 such as a DVD. The program stream stored on recording medium 250 may comprise units containing a 2048-byte pack, a 12-byte unit block ID code, and a 4-byte cyclic redundancy check (CRC) code. The pack may further comprise a plurality of transport stream packets (for example, 10 packets), an application header (Appl. Header) regarding the packets, a substream ID (Substr. ID) code, a packetized elementary stream (PES) header, and a pack header having a system clock reference (SCR).

Figure 6:
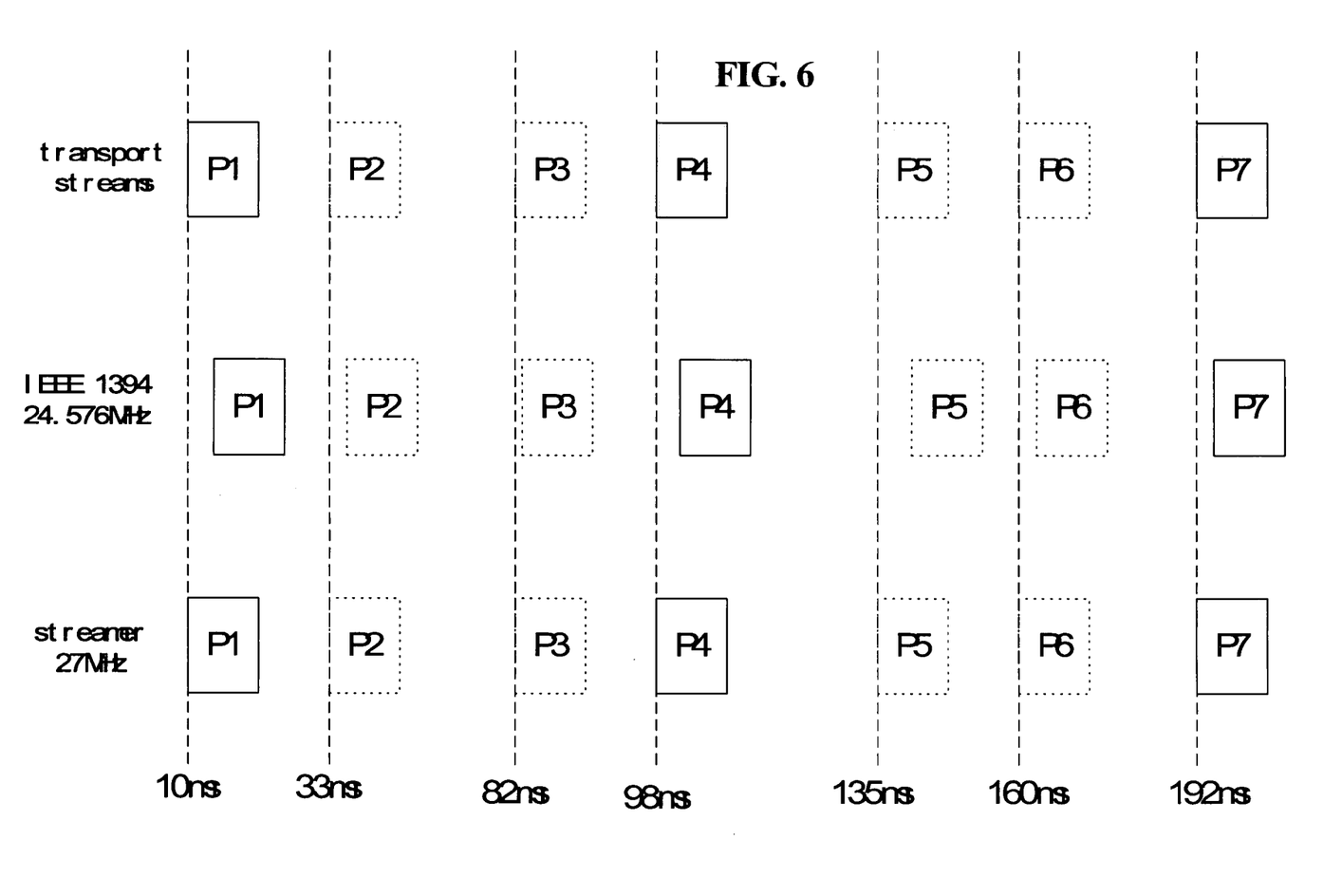
FIG. 6 is a block diagram for explaining the method to compensate the clock references of a transport stream distorted by the communication interface shown in FIG. 4.

As shown in FIG. 6, while the transport stream packets are transmitted from set top box 100 through the IEEE-1394 interface to stream recording unit 230, the time interval between two successive transport stream packets undergoes a change because the clock frequency of the transport stream packets is different from that of the IEEE-1394 communication interface.

Accordingly, the stream recording unit 230 compensates variation of PCR included in a header of each received transport packet and records in the data format shown in FIG. 5B. The compensating method will be explained below.

Figure 5C:
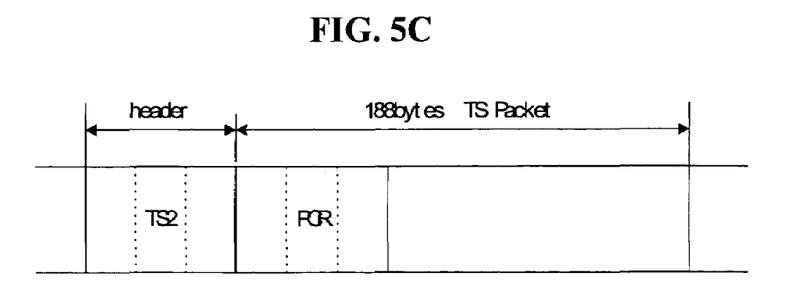
FIG. 5c is a pictorial representation of data streams carried from a streamer to the communication interface.

Afterwards, a stream reproducing unit 260 separates a data stream reproduced from the recording medium 250 to transport packets based on 27 MHz system clock from the clock controller 240, inserts 4-byte transport header in each transport packet as shown in FIG. 5C, and outputs transport packets sequentially. At this time, a time stamp counted based on 27 MHz system clock is added to the transport header.

The stream reproducing unit 260 retrieves the original transport stream from streamer 200 and outputs the transport stream to a digital transport processing unit 270. Receiving the retrieved transport stream, a digital transport processing unit 270 of the streamer 200 extracts transport stream packets from the transport stream and adds a 4-byte transport header having a time stamp of a clock of 24.576 MHz to each extracted transport stream packet as shown in FIG. 5a. Then the transport stream packets are transmitted through the IEEE-1394 isochronous bus to set top box 100, the transmission of the transport stream packets being synchronized with the transport time reference values of the transport stream.

In set top box 100, a digital receiving processing unit 140 receives the transport stream from streamer 200 and extracts time stamps contained in the transport headers. Using the extracted time stamps and the system clock of 24.576 MHz, transport stream packets are outputted to system decoder 110.

Figure 7:
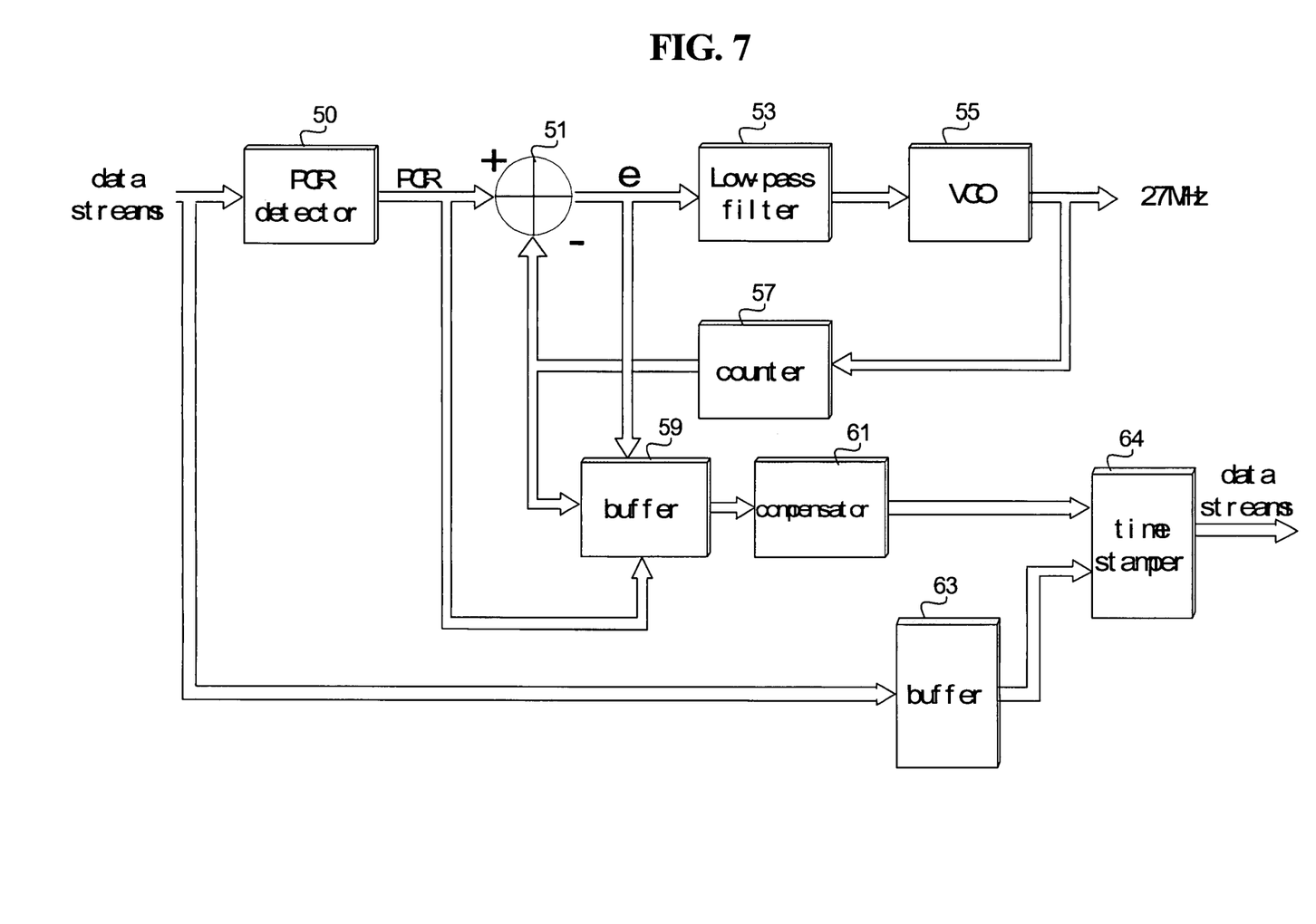
FIG. 7 is an apparatus for compensating the clock references of a transport stream in accordance with an embodiment of the present invention.

The method and apparatus for compensating clock references using PCRs contained in transport stream packets transmitted through the IEEE-1394 communication interface will be explained in detail with reference to FIGS. 6 and 7. It is assumed that PCR values are contained only in transport stream packets P1, P4, and P7 shaded in FIG. 6.

If a PCR detector 50 detects a PCR value contained in the transport stream packet P1, a subtractor 51 subtracts the output of a counter 57 from the PCR value. The subtraction result, which is a digital error signal (e1), is converted into an analog error signal and applied to a low-pass filter 53. The low-pass filtered error signal is then applied to a voltage-controlled oscillator (VCO) 55, thereby adjusting the oscillation frequency of VCO 55 so that the oscillator clock can be locked with the PCR value. The digital error signal (e1), the PCR value, and the counter value (t1) at the time the transport stream packet P1 is received are temporarily stored in a buffer 59 and the transport stream packet P1 is stored in a buffer 63.

If a second and third transport stream packets P2 and P3 having no PCR values are received, the outputs of counter 57 are temporarily stored in buffer 59 as temporary transport time references of the transport stream packets and the transport stream packets P2 and P3 are sequentially stored in buffer 63.

Subsequently, when the PCR value of a fourth transport stream packet P4 is detected by PCR detector 50, subtractor 57 subtracts the value of counter 57 from the detected PCR value. The oscillation frequency of VCO 55 is adjusted based upon the subtraction result (e4). Also, the error signal (e4), the counter value (t4), and the PCR value are temporarily stored in buffer 59 and the transport stream packet P4 is stored in buffer 63.

Next, a compensation unit 61 loads the PCR value of the first transport stream packet P1 from buffer 59 and transmits the PCR value to a time stamper 64. Time stamper 64 reads the first transport stream packet P1 from buffer 63 and records the received PCR value in the header of the transport stream packet P1 as a receiving time stamp, which will be used as a time reference for transmitting the transport stream packet P1 in playback. Then compensation unit 61 calculates the transport time references of the second and third transport stream packets P2 and P3 in the following way. First, the time interval Δt between the counter values t1 and t4 is calculated. Second, the difference Δt2 between t1 and the temporary clock reference of P2 stored in buffer 59 is calculated. Likewise, the difference Δt3 between t1 and the temporary clock reference of P3 stored in buffer 59 is calculated. Then, the difference Δp between the PCR values of the transport stream packets P1 and P4 is calculated. The difference between Δt and Δp is denoted by the error Δe, which will be used to compensate the temporary transport time reference values of P2 and P3.

The values Δe×Δt2/Δt and Δe×Δt3/Δt are added to the temporary transport time reference values of P2 and P3 respectively and the compensated transport time reference values are transmitted to time stamper 64. Time stamper 64 loads the transport stream packets P2 and P3 from buffer 63 and records each received compensated transport time reference value in the header of the associated transport stream packet as a recording time stamp. Then compensation unit 61 loads the PCR value of the transport stream packet P4 from buffer 59 and outputs the value to time stamper 64. Time stamper 64 loads the transport stream packet P4 from buffer 63 and records the received PCR value in the header of the transport stream packet P4 as a recording time stamp.

The same procedure is repeated for the following transport stream packets P5, P6, . . . Pn and therefore the temporary transport time reference values of the transport stream packets distorted by the digital communication interface can be compensated.

As explained so far, stream recording unit 230 in streamer 200 compensates the transport time references of transport stream packets based on the PCR values before recording the transport stream packets. For presentation of the transport stream, the stored transport stream packets are transmitted through the IEEE-1394 isochronous bus to set top box 100. Even though the time intervals of the transport stream packets are distorted when transmitted to streamer 200, the time intervals of the transport stream packets remain compensated when transmitted to set top box 100 for presentation.

A time information recording and clock synchronizing apparatus for a digital data stream in accordance with the present invention is explained in detail with reference to FIGS. 8 to 11.

Figure 8:
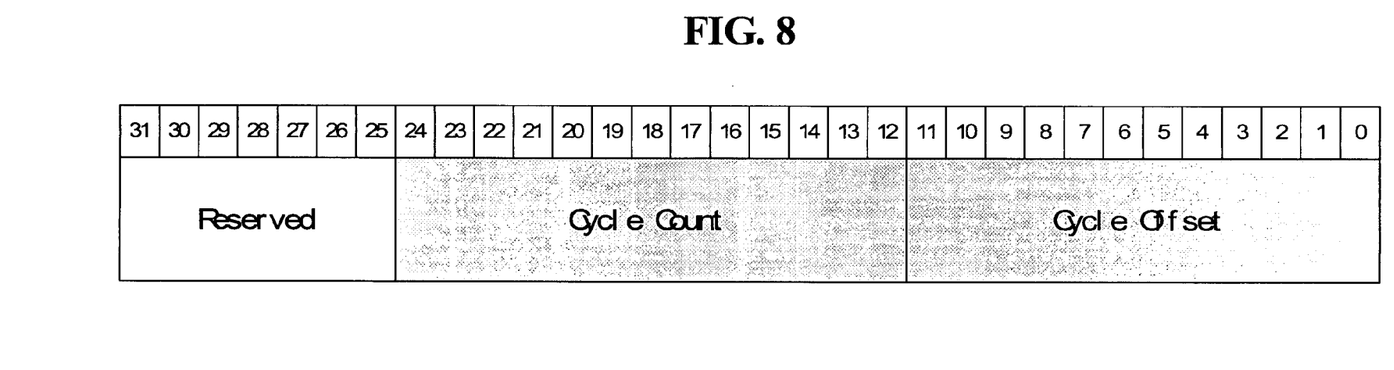
FIG. 8 shows time information included in headers of data streams carried by the communication interface.

FIG. 8 shows the data format of time information used in IEEE 1394 communication interface that is composed of 12-bit cycle offset field, 13-bit cycle count field and 7-bit reserved. The cycle offset field counts a clock of 24.576 MHz till BFF(h), which is equivalent to 125 usec, and the cycle count field counts the 125 usec-long time units till 1F3F(h) which is equivalent to 1 second. In other words, the cycle offset field generates a carry every BFF(h) count of the 24.576 MHz clock and recounts from zero while the cycle count field counts the carry.

Figure 9:
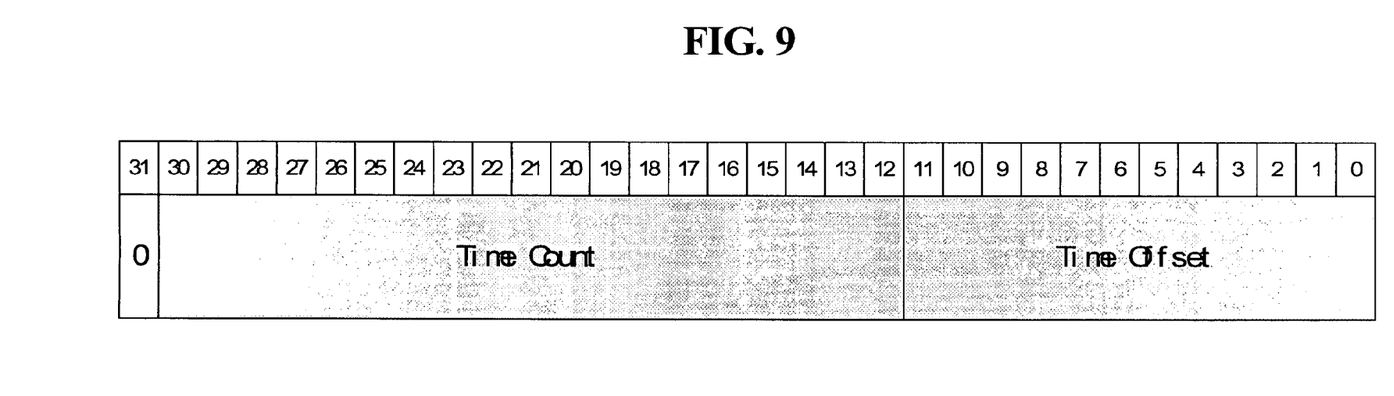
FIG. 9 shows data format of time information included in headers of data streams carried from a streamer to the communication interface, the data format being adopted by another embodiment of time reference recording method for digital data streams in accordance with the present invention.

FIG. 9 shows the data format of time information used in a streamer for synchronizing with the system clock of IEEE 1394 communication interface shown in FIG. 8 in accordance with the present invention. The format of time information is composed of 12-bit time offset field, 19-bit time count field and 1-bit flag.

The time offset field counts a 27 MHz streamer clock, in PLL with PCRs in transport packets, till D2E(h) which is equivalent to 125 usec and the time count field counts the 124 usec-long time units till 65 seconds. That is, the time offset field generates a carry every D2E(h) count of the 24 MHz clock and recounts from zero while the time count field counts the carry from the time offset field.

If the 1-bit flag is set, it means that the time count and the time offset are same with PCR in a transport packet, otherwise, it means that the time count and the time offset are created based on the streamer clock. Time information whose format is shown in FIG. 9 and whose value is identical to PCR included in a 188-byte-long transport packet is added to the packet. At this time, the 1-bit flag of the format shown in FIG. 9 is set. If a transport packet does not include PCR, time information counted based on the 27 MHz system clock is added to the packet not including PCR. The 1-bit flag of the time information is made to zero.

Figure 10:
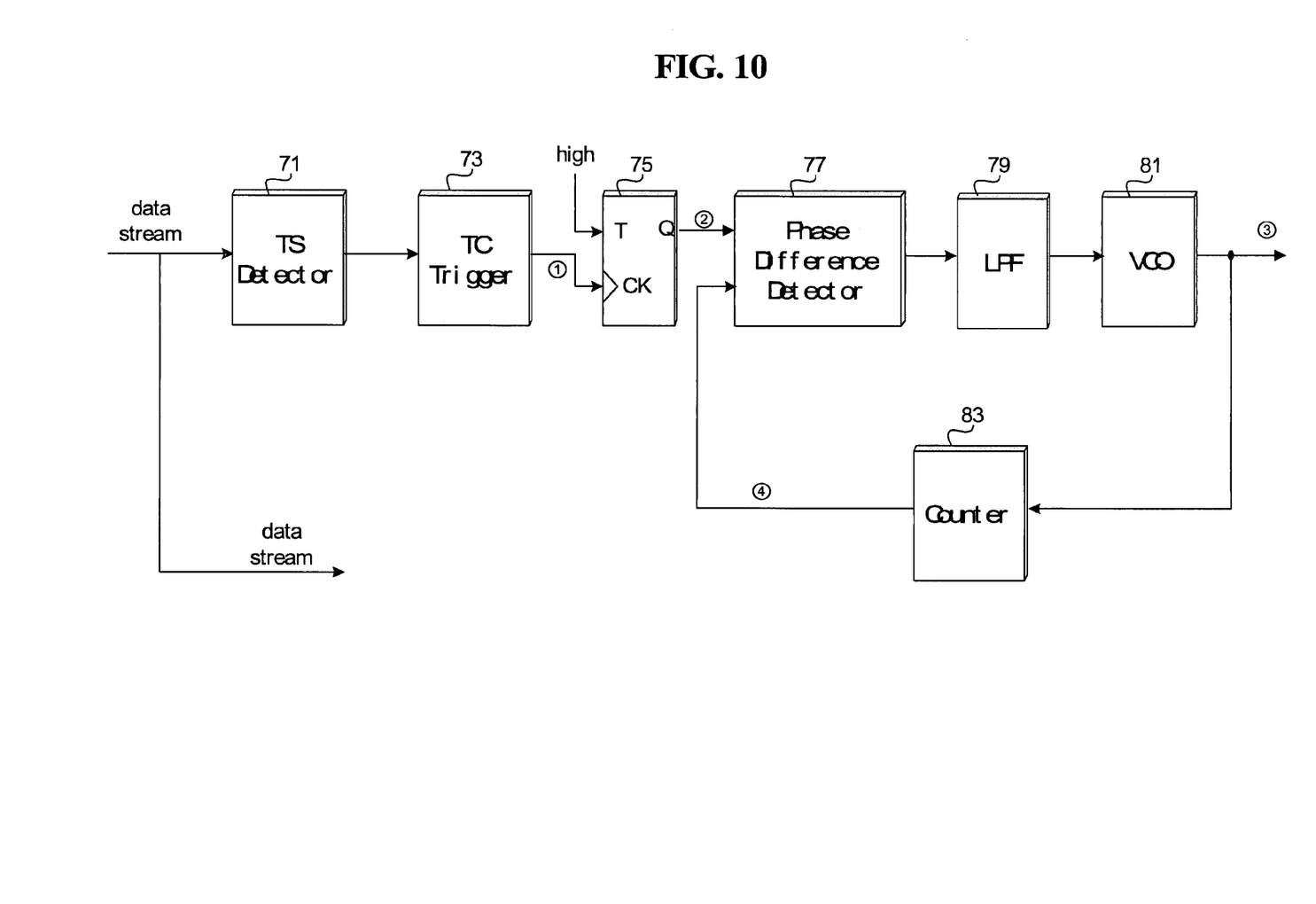
FIG. 10 is a block diagram of an apparatus for compensating the clock synchronization of transport streams in accordance with another embodiment of the present invention, the apparatus synchronizing system clocks between systems having different system clock frequencies as shown in FIGS. 8 and 9.
Figure 11:
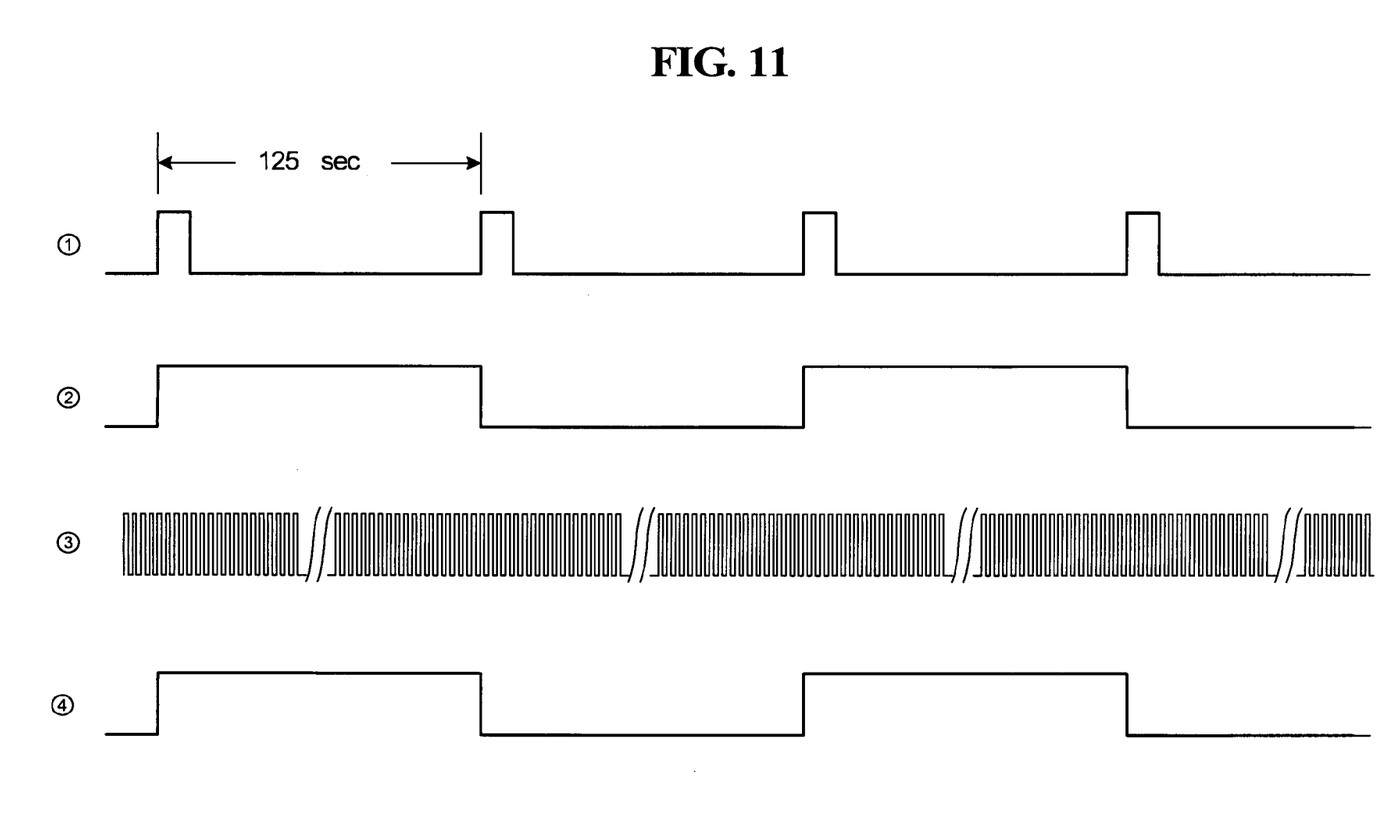
FIG. 11 is pictorial output waveforms of major elements shown in FIG. 10.

An embodiment of a clock compensating apparatus for a digital data stream in accordance with the present invention is explained now with reference to FIGS. 10 and 11.

If the stream reproducing unit 260 of the streamer 200 writes time stamps whose format is shown in FIG. 9 in transport packets and delivers the packets to the digital transport processing unit 270 of IEEE 1394, a time stamp detector 71 in the digital transport processing unit 270 detects time stamps in the transport packets and sends them to a trigger 73. The trigger 73 generates a pulse, as illustrated in ① of FIG. 11, every transition (equivalent to 125 usec) in LSB of the time count field of the time stamp shown in FIG. 9.

The pulses from the trigger 73 is divided by a T flip flop 75 as illustrated in ② of FIG. 11 and then applied to a phase difference detector 77. On the other hand, each time a counter 83 counts the 24.576 MHz system clock (③ in FIG. 11) of the IEEE 1394 oscillated from a VCO 81 to 3071, a pulse whose width is 125 usec (④ in FIG. 11) is applied to the phase difference detector 77. Accordingly, phase error equivalent signal is inputted to a low-pass filter 79 from the phase difference detector 77 and is then converted to DC voltage which is applied to the VCO 81. The VCO 81 compensates phase of the 24.576 MHz system clock as much as variation of the applied DC voltage.

In conclusion, if a transport packet is delivered to the IEEE 1394 during reproduction in the streamer 200 after time information shown in FIG. 9 is added to a header of the packet, system clock of 24.576 MHz used in the IEEE 1394 can be synchronized using the time information based on 27 MHz clock.

In addition, if the IEEE 1394 interface sends transport packets to the stream recording unit 230 after adding time information shown in FIG. 8 to each transport packet when transport packets are delivered from the set top box 100 to the streamer 200, the stream recording unit 230 can synchronize its own system clock using the time information created based on 24.576 MHz. The apparatus of FIG. 10 can be used for this synchronizing operation.

The trigger 73 generates a pulse, as illustrated in ① of FIG. 11, every transition (equivalent to 125 usec) in LSB of cycle time count field of the time stamp shown in FIG. 8.

The pulses from the trigger 73 is divided by a T flip flop 75 as illustrated in ② of FIG. 11 and then applied to a phase difference detector 77. On the other hand, each time a counter 83 counts the 27 MHz system clock (③ in FIG. 11) of the streamer 200 oscillated from a VCO 81 to 3071, a pulse whose width is 125 usec (④ in FIG. 11) is applied to the phase difference detector 77. Accordingly, phase error equivalent signal is inputted to a low-pass filter 79 from the phase difference detector 77 and is then converted to DC voltage which is applied to the VCO 81. The VCO 81 compensates phase of the 27 MHz system clock as much as variation of the applied DC voltage.

In conclusion, if a transport packet is delivered to the stream recording unit 230 during transmission from the set top box 100 to the streamer 200 after time information shown in FIG. 8 is added to a header of the packet, system clock of 27 MHz used in the stream recording unit 230 can be synchronized using the time information counted based on 24.576 MHz clock.

The above-explained invention using the time information shown in FIG. 9 can efficiently prevent clock variation caused from different system clock frequencies of communication interface and transport stream although the recorded transport stream is reproduced through the IEEE communication interface after being recorded from the set top box 100 to the streamer 200 through the IEEE communication interface. Accordingly, a decoder 110 in the set top box 100 can synchronize its own system clock using PCRs included in a previous transport packet and decode a current transport packet not containing PCR at an exact time. Consequently, the present invention is able to meet PCR deviation of transport packets not larger than 30 ppm from 27 MHz.

The invention may be embodied in other specific forms without departing from the sprit or essential characteristics thereof.

For example, unlike the previous embodiment, it is also possible that set top box 100 creates PCR values for transport stream packets with no PCR values and inserts the created PCR values to associated transport stream packets before transmitting the transport stream packets through the IEEE-1394 serial interface to streamer 200. In this case, since every transport stream packet contains a PCR, the decoder clock can be adjusted precisely using the PCR values though the time intervals between consecutive transport stream packets are distorted by the IEEE-1394 interface.

EFFECT OF THE INVENTION

According to the apparatus and method for compensating the transport time references of a digital data stream, failures in a seamless presentation of data retrieved from a streamer can be prevented in the streamer by compensating all PCRs before or after recording the digital data stream to the streamer through an IEEE-1394 communication interface, though program clock references contained in the data stream become different from the actual arrival time of the digital data stream because of different clock frequencies of the digital data stream and the IEEE-1394 communication interface and the digital data is stored on the streamer as transmitted.

Furthermore, according to the apparatus and method for compensating the transport time references of a digital data stream, transport packets can be synchronized with 24.576 MHz by adding time information expressed based on 27 MHz clock when they are transmitted from a streamer with system clock of 27 MHz to IEEE 1394 interface with system clock of 24.576 MHz. That is, the IEEE 1394 interface synchronizes its system clock (24.576 MHz) with the time information added to the transport packets. Consequently, the time intervals between consecutive transport stream packets can be maintained as they are although the packets are transmitted between apparatuses with different system clock frequencies.

What is claimed is:

1. A method for creating digital transport stream units, comprising the steps of:
   (a) detecting program clock references contained in digital transport stream packets received from a set top box through a digital interface;
   (b) creating a transport time reference for each of the transport stream packets based upon the detected program clock references and arrival times of the corresponding transport stream packets; and (c) creating the transport stream units by adding each of the created transport time references to an associated one of the transport stream packets, wherein said step (b) creates the transport time reference for an arbitrary one of the transport stream packets transmitted between two of the transport stream packets having program clock references by detecting the program clock reference value associated with each of two of the transport stream packets, and subtracting counter values from the detected program clock reference values, wherein the counter values are arrival times of the two transport stream packets.

2. The method set forth in claim 1, wherein said step (b) creates the transport time reference for each of the transport stream packets based upon an error, defined as a difference between time differences of selectively inserted program clock references and an arrival time difference for each of the transport stream packets containing the program clock references, wherein the program clock reference value and the error are stored in a temporary buffer, and the transport stream packets are stored sequentially in a second buffer.

3. The method set forth in claim 2, wherein said step (b) includes the steps of:

loading the program clock reference values from the temporary buffer into a compensation unit, increasing or decreasing the transport time reference by a time corresponding to said error; and transmitting the program clock reference values from the compensation unit to a time stamper, the time stamper reading the one transport stream packet from the second buffer, and recording the received program clock reference value in a header of the one transport stream packet as a receiving time stamp, which will be used as a time reference for transmitting the one transport stream packet in playback.

4. The method set forth in claim 2, wherein said step (b) creates the transport time reference for an the arbitrary one of the transport stream packets received between the two transport stream packets having program clock references by compensating the arrival time of the arbitrary one of the transport stream packets by an amount corresponding to a linear proportion of the arrival time difference between the arbitrary one of the transport stream packets and a first one of said two transport stream packets to the arrival time difference of said two transport stream packets.

5. The method set forth in claim 1, wherein said transport time reference is reference information upon which timing of transmission of the transport stream packets is based when the transport stream packets are transmitted to an external device after the transport stream packets are reproduced from a storage medium.

6. The method set forth in claim 1, further comprising a step of recording the created transport stream units on a rewritable recording medium having a digital data recording format.

7. A method for creating digital transport stream units, comprising the steps of:

(a) storing digital transport stream packets received from a set top box through a digital interface together with their arrival times temporarily;

(b) compensating the temporarily stored arrival time of each of the transport stream packets based upon a time difference of program clock references and an arrival time difference of the transport stream packets when more than two of the program clock references are detected from said received digital transport stream packets; and (c) creating transport stream units by adding each of the compensated arrival times to associated ones of the transport stream packets as a transport time references, wherein said step (c) creates the transport time reference for an arbitrary one of the transport stream packets transmitted between two of the transport stream packets having program clock references by detecting the program clock reference value associated with each of two of the transport stream packets, and subtracting counter values from the detected program clock reference values, wherein the counter values are arrival times of the two transport stream packets.

8. A method for creating digital transport stream units, comprising the steps of:

(a) detecting program clock references from transport stream packets received from a set top box through a digital interface while storing the received digital transport stream packets together with their arrival times;

(b) detecting the stored arrival times of the transport stream packets containing the detected program clock references;

(c) comparing a difference of the two program clock references detected in said step (a) with an arrival time difference of the two transport stream packets detected in said step (b);

(d) compensating the stored arrival time of each of the transport stream packets based upon the comparison result; and (e) creating transport stream units by adding the compensated arrival time to each of the transport stream packets as a transport time references, wherein said step (e) creates the transport time reference for an arbitrary one of the transport stream packets transmitted between two of the transport stream packets having program clock references by detecting the program clock reference value associated with each of two of the transport stream packets, and subtracting counter values from the detected program clock reference values, wherein the counter values are arrival times of the two transport stream packets.

9. An apparatus for recording digital transport streams, comprising:

means for detecting program clock references contained in digital transport stream packets received from a set top box through a digital interface;

means for comparing the detected program clock references with arrival times of the transport stream packets;

means for creating a transport time reference for an arbitrary one of said transport stream packets transmitted between two of the transport stream packets having program clock references by detecting the program clock reference value associated with each of two of the transport stream packets, and subtracting counter values from the detected program clock reference values, the counter values being arrival times of the two transport stream packets; and means for constructing transport stream units by adding the created transport time reference of each of the transport stream packets to the arbitrary one of the transport stream packets.

10. An apparatus for recording digital transport streams, comprising:
- means for creating arrival times of digital transport stream packets received from a set top box through a digital interface;
- means for detecting program clock references contained in the received digital transport stream packets;
- means for creating an transport time reference for an arbitrary one of the transport stream packets transmitted between two of the transport stream packets having program clock references by detecting the program clock reference value associated with each of two of the transport stream packets, and subtracting counter values from the detected program clock reference values, the counter values being arrival times of the two transport stream packets;
- means for comparing the detected program clock references with the created arrival times;
- means for compensating the created arrival times based upon the comparison result; and
- means for constructing transport stream units by adding a compensated arrival time to the arbitrary one of the transport stream packets as the transport time reference.

11. The apparatus set forth in claim 10, wherein said compensating means compensates the created arrival times of the received digital transport stream packets so that differences between the detected program clock references are equal to differences between the arrival times of the transport stream packets containing the detected program clock references.

12. An apparatus for recording digital transport streams, comprising:
- a time information extractor for detecting program clock references contained in digital transport stream packets received from a set top box through a digital interface;
- a substracter for subtracting counter values from the detected program clock reference values associated with each of two of the transport stream packets, a first one preceding an arbitrary one of the transport stream packets and a second one following an arbitrary one of the transport stream packets, the counter values being arrival times of the two transport stream packets;
- a time comparator for comparing the detected program clock references from said time information extractor with arrival times of the transport stream packets;
- a transport time generator for creating a transport time reference for each of said transport stream packets based upon the comparison result from said time comparator; and
- a data constructor for constructing transport stream units by adding the created transport time reference from said transport time generator of each of said transport stream packets to the arbitrary one of the transport stream packets.

13. The apparatus set forth in claim 12, wherein said transport time generator creates the transport time reference for each of the transport stream packets based upon an error, defined as a difference between time differences of the detected program clock references and the arrival time difference for each of the transport stream packets containing the program clock references.

14. The apparatus set forth in claim 13, wherein said transport time generator increases or decreases the transport time reference by a time proportional to said error.

15. The apparatus set forth in claim 13, wherein said transport time generator creates the transport time reference for the arbitrary one of the transport stream packets received between two of the transport stream packets having the program clock references by compensating the arrival time of the arbitrary transport stream packet by an amount corresponding to a linear proportion of the arrival time difference between the arbitrary transport stream packet and a first transport stream packet of said two transport stream packets to the arrival time difference of said two transport stream packets.

16. An apparatus for recording digital transport streams, comprising:
- a transport time generator for creating arrival times of digital transport stream packets received from a set top box through a digital interface;
- a time information extractor for detecting program clock references contained in the received digital transport stream packets;
- a substracter for subtracting counter values from the detected program clock reference values associated with each of two of the transport stream packets, a first one preceding an arbitrary one of the transport stream packets and a second one following an arbitrary one of the transport stream packets, the counter values being arrival times of the two transport stream packets;
- a time comparator for comparing the detected program clock references from said time information generator with the created arrival times from said transport time generator;
- a time compensator for compensating the created arrival times from said transport time generator based upon the comparison result of said time comparator; and
- a data constructor for constructing transport stream units by adding the compensated arrival times from said time compensator to the arbitrary one of the transport stream packets as a transport time reference.

17. The apparatus set forth in claim 16, wherein said time compensator compensates the created arrival time based upon an error, defined as a difference between time differences of the detected program clock references and the arrival time difference of each of the transport stream packets containing the program clock references.

18. The apparatus set forth in claim 17, wherein said time compensator increases or decreases the created arrival time by a time proportional to said error.

19. The apparatus set forth in claim 17, wherein said time compensator compensates the created arrival time of the arbitrary one of the transport stream packets received between two transport stream packets having the program clock references by an amount corresponding to a linear proportion of the arrival time difference between the arbitrary transport stream packet and a first transport stream packet of said two transport stream packets to the arrival time difference of said two transport stream packets.

20. The apparatus as set forth in claim 16, wherein a clock frequency of the digital interface is 24.576 Mhz., whereas a clock frequency for recording the digital transport streams is 27 Mhz.

* * * * *